United States Patent

Holmes et al.

[11] Patent Number: 6,137,202
[45] Date of Patent: *Oct. 24, 2000

[54] INSULATED COIL AND COILED FRAME AND METHOD FOR MAKING SAME

[75] Inventors: Carl Alfred Holmes, Erie; Robert Michael Koca, Fairview; William Donald Fisher, Erie, all of Pa.

[73] Assignee: General Electric Company, Erie, Pa.

[*] Notice: This patent issued on a continued prosecution application filed under 37 CFR 1.53(d), and is subject to the twenty year patent term provisions of 35 U.S.C. 154(a)(2).

[21] Appl. No.: 09/300,242

[22] Filed: Apr. 27, 1999

[51] Int. Cl.⁷ ....................................................... H02K 1/00
[52] U.S. Cl. ........................... 310/180; 310/194; 310/208; 29/598; 29/605
[58] Field of Search ............................... 310/180, 45, 194, 310/179, 208; 29/598, 605; 427/116, 120, 386; 174/110 E

[56] References Cited

U.S. PATENT DOCUMENTS

| | | | |
|---|---|---|---|
| 3,333,131 | 7/1967 | Bush et al. | 310/194 |
| 3,566,171 | 2/1971 | Tichy et al. | 310/180 |
| 3,602,814 | 8/1971 | Quirk | 324/137 |
| 3,848,208 | 11/1974 | Dawson et al. | 336/96 |
| 4,127,695 | 11/1978 | Hirakawa et al. | 428/371 |
| 4,163,912 | 8/1979 | Gottung et al. | 310/45 |
| 4,376,904 | 3/1983 | Horrigan | 310/208 |
| 4,471,247 | 9/1984 | Cotton | 310/45 |
| 4,581,293 | 4/1986 | Saunders | 428/413 |
| 4,617,725 | 10/1986 | Holter et al. | 29/598 |
| 4,714,576 | 12/1987 | Cotton et al. | 264/46.5 |
| 4,774,102 | 9/1988 | Kiefer et al. | 427/475 |
| 4,990,810 | 2/1991 | Newhouse | 310/194 |

FOREIGN PATENT DOCUMENTS

| | | |
|---|---|---|
| 1150115 | 4/1969 | United Kingdom . |
| 2 002 965 | 2/1978 | United Kingdom . |

*Primary Examiner*—Nestor Ramirez
*Assistant Examiner*—Joseph Waks
*Attorney, Agent, or Firm*—Ann Agosti; Carl A. Rowold; David J. Risley

[57] ABSTRACT

An insulated coil for use in a coil and pole assembly comprising an electrically conductive coil including a plurality of aligned, overlapping turns that are coated with a powder coating material so as to be electrically insulated from each other. The powder coated coil is heated so as to partially cure the powder coating material and then fitted about its associated pole. Once disposed about the pole, the coil is compressed in the vertical and horizontal directions, and heated while in the compressed state to completely cure the powder coating material.

11 Claims, 10 Drawing Sheets

INSULATED COIL AND COILED FRAME AND METHOD FOR MAKING SAME

BACKGROUND OF THE INVENTION

The invention generally relates to an insulated coil for coil and pole assemblies and to coiled frames. More particularly, the invention relates to a coil and pole assembly and a coiled frame which can be manufactured quickly with relative ease, and which has increased resistance to in-service environmental conditions.

Coil and pole assemblies normally include a magnetizing coil comprising a plurality of turns of copper wire or strap which surround a magnetizable ferrous metal pole. The several turns of the coil are electrically insulated from one another with a material or materials known as turn-to-turn insulation. In addition, the entire coil is electrically insulated from the pole with a material or materials known as ground insulation.

Conventional processes of providing turn-to-turn insulation and ground insulation are highly labor intensive. Presently, the manufacturing process typically comprises dipping the bare copper coil in a bake-dry varnish and then transporting the varnished coil to a turn-to-turn insulation station where sheets of insulation material are manually inserted between each turn of the coil. The coil is permitted to air dry for several hours to allow the varnish to penetrate or "wet" the sheets of insulation material. After the expiration of this time period, the coil is manually trimmed to remove the bulk of the sheet insulation material that extends beyond the periphery of each coil turn. Once having been trimmed, the coil is then pressed and cured. Typically, these steps are accomplished simultaneously by compressing the coil in a clamp fixture in both the horizontal and vertical directions within a hydraulic press and by attaching the coil leads to an electrical power supply that heats the coil. Once removed from the press, the clamped coil is permitted to cool. Upon removal from the fixture, remaining excess turn-to-turn insulation on the coil is removed, typically with the aid of a hand-held rotary brush.

After the turn-to-turn insulation has been applied in the manner described above, the coil is prepared for the application of ground insulation. Typically, the coil is moved to a ground insulation station where molding putty is applied to the ends of the coil and insulation tape wrapped about the coil. During the wrapping process, thermally resistant strips of material such as NOMEX® brand fiber products (NOMEX is a trademark of DuPont Co.), commonly referred to as shims, are added to the top and bottom surfaces of the coil to both ensure the correct coil height and to provide the arcuate surface necessary for proper attachment to a magnet frame. The insulation tape is carefully wrapped layer upon layer about the coil, inside and out, by hand. Armor tape is then wrapped about the insulation tape to provide a protective layer for the insulation tape.

At this point, the coil is prepared for assembly into the machine frame along with its associated pole. Once installed in the frame, power cables are attached to the coil leads, and the connections are hand-wrapped with insulation tape. After the coil and pole assemblies have been so installed, the coiled frame is varnish masked by hand and then preheated and vacuum pressure impregnated with varnish. The coiled frame is cured in an oven and permitted to cool. The coiled frame is then for a second time preheated, vacuum pressure impregnated with varnish, cured in an oven, and permitted to cool.

As can be appreciated from the above recitation, present manufacturing techniques used in insulated coil and coiled frame manufacture are time consuming and require a large amount of manual labor. In addition, such insulated coils are susceptible to mechanical failure and/or grounding due to compression and expansion of the coil during use, limiting the usable life of the coiled frame assembly.

From the above, it can be appreciated that it would be advantageous to have an insulated coil and coiled frame which avoids the problems identified above.

BRIEF SUMMARY OF THE INVENTION

A preferred embodiment of the present invention substantially avoids the aforementioned difficulties associated with the assembly and use of conventional coils and coiled frames. Generally speaking, this embodiment relates to an insulated coil for use in a coil and pole assembly intended for installation in a magnet frame. The insulated coil comprises an electrically conductive coil having a frame side and a pole side and including a plurality of aligned, overlapping turns that form a pole opening. Each of the coil turns includes an outer surface that is to be insulated from each other. To provide for this insulation, the coil further comprises a powder coating material that is disposed on the outer surfaces of the coil turns. Normally, the electrically conductive coil has been compressed to a desired dimension and the powder coating material cured while the coil is in the compressed orientation such that the electrically conductive coil permanently remains in the desired orientation.

In addition, a preferred embodiment of the present invention relates to a method for insulating an electrically conductive coil for use in a coil and pole assembly. The method comprises the steps of coating the electrically conductive coil with a powder coating material, heating the powder coated coil a first time to partially cure the powder coating material, fitting the powder coated coil about a pole, compressing the powder coated coil about the pole, and heating the powder coated coil a second time while in the compressed state to completely cure the powder coating material.

The objects, features, and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF THE INVENTION

Figure 1:
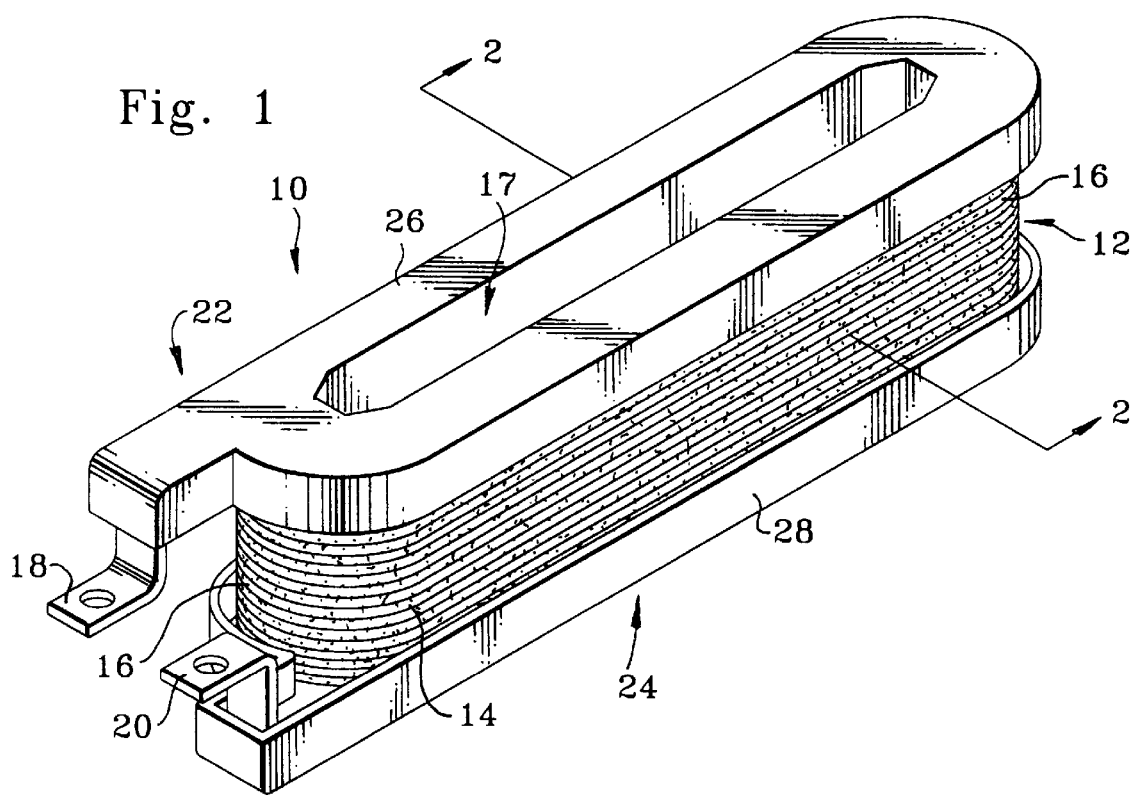
FIG. 1 is a perspective view of an insulated coil.
Figure 2:
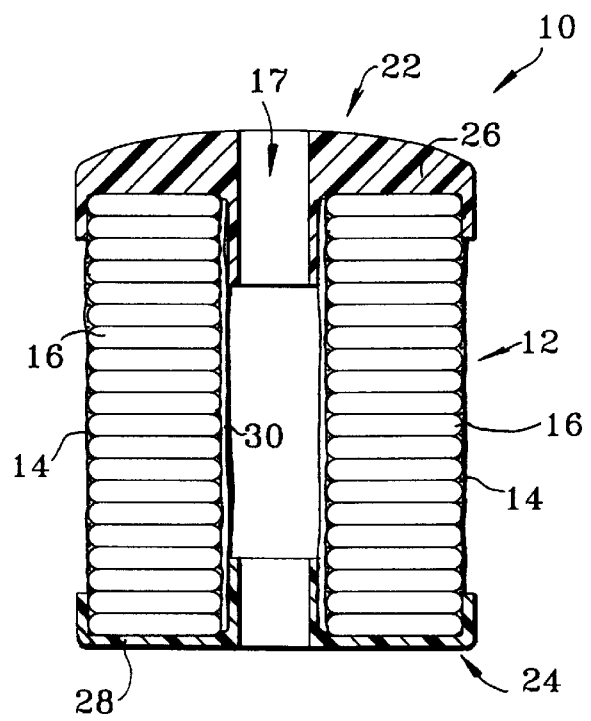
FIG. 2 is a cross-sectional view of the coil of FIG. 1 taken along line 2—2.

Referring now in more detail to the drawings, in which like numerals indicate corresponding parts throughout the several views, FIGS. 1 and 2 illustrate an insulated coil 10 constructed in accordance with a preferred embodiment of the present invention. As indicated in FIG. 1, the insulated coil 10 generally comprises an electrically conductive coil 12 that is provided with a coating of electrically insulative material 14. Preferably, the coating of electrically insulative material 14 comprises a powder coating material 42 described in greater detail below.

The electrically conductive coil 12 typically comprises an elongated wire or strand of metallic material such as copper. This wire or strand normally is wrapped in a coiled configuration such that the finished coil 12 comprises a plurality of coil turns 16 that are configured in an aligned, overlapping arrangement and which form an elongated pole opening 17. The electrically conductive coil 12 normally is configured such that its ends extend beyond the periphery of the coil turns 16 to form first and second terminal leads 18 and 20. These leads 18, 20 usually extend from the frame side 22 (top side in FIGS. 1 and 2) and the pole side 24 (bottom in FIGS. 1 and 2) of the coil 12 such that the leads are positioned near to each other, as indicated in FIG. 1.

As is depicted in FIGS. 1 and 2, the insulated coil 10 preferably includes first and second end pieces or bobbins 26 and 28. As shown most clearly in FIG. 2, these bobbins 26, 28 are sized and configured to encapsulate the frame and pole sides 22 and 24 of the coil 12 such that a bobbin caps each opposing side of the coil. The bobbins 26, 28 are the subject of commonly assigned U.S. patent application Ser. No. 09/300,243, entitled Ground Insulation for Coils, filed concurrently herewith and hereby incorporated by reference into the present disclosure. As is described in greater detail in this patent application, each of the bobbins 26, 28 preferably comprises a polymeric material that can be molded into the desired shape. Most preferably, the bobbins 26, 28 comprise a sheet molding compound (SMC) of glass fiber filler and heat resistant thermoset polymeric material. Presently deemed acceptable, for example, is a material known as QC3450 supplied by Quantum Composites. As will be appreciated by those having ordinary skill in the art, alternative durable and heat resistant materials could be substituted for this preferred material, if desired.

In addition to the bobbins 26, 28, the insulated coil 10 can include an auxiliary pole insulator 30 which is adapted to fit within the pole opening 17 of the coil 12. As indicated in FIG. 2 and the exploded view of FIG. 3, this insulator 30 is adapted for insertion in the pole opening 17 between the bobbins 26, 28. This insulator 30 adds an additional measure of insulation protection between the insulated coil 10 and its associated pole. When this layer of insulation 30 is used, typically it is constructed of a folded sheet of aramid material such as NOMEX® material (see FIG. 3). The insulated coil 10 further can include one or more strips 32 of protective material that are placed between the first and second turns 16 of the electrically conductive coil 12 at the frame and pole sides 22 and 24 of the coil (see FIG. 6). Typically these strips 32 extend along the entire length of the coil 10 to provide protection to the insulated coil 10 during the pressing of the coil described below during the discussion of the manufacturing process. Normally, these strips 32 comprise an insulating material and are secured in place on the coil 12 with insulative tape 34, such as epoxy impregnated tape.

Figure 4:
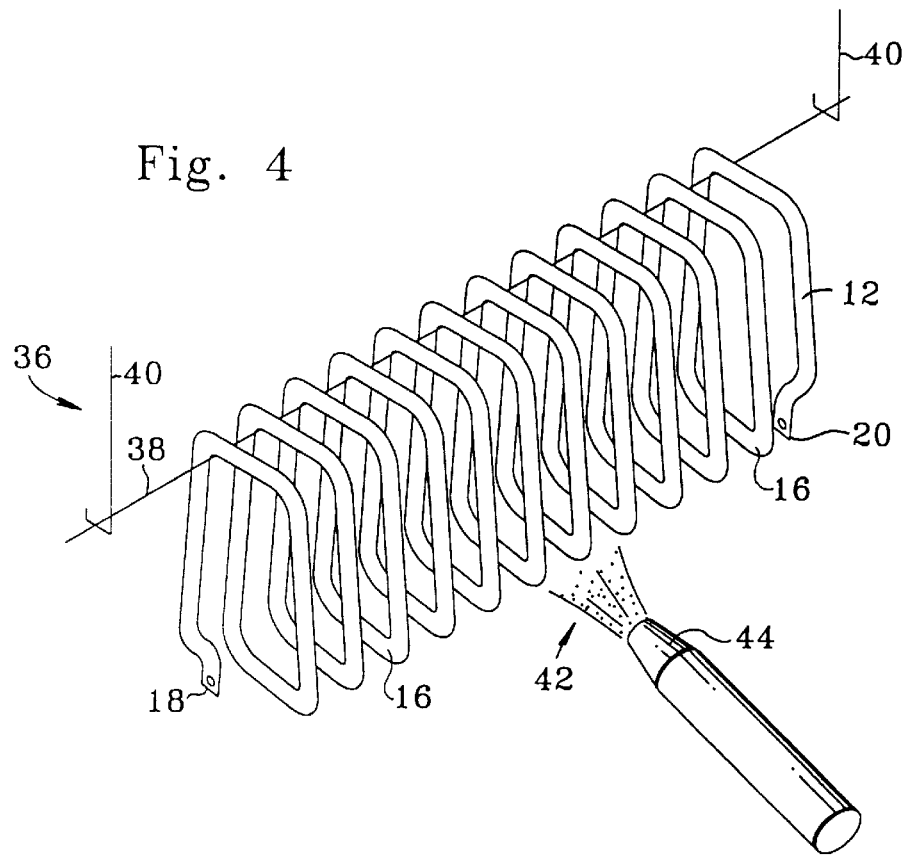
FIG. 4 is a perspective view of a bare coil being coated with an electrically insulative material.

The general construction of the insulated coil 10 having been described above, the present disclosure will now turn to the manufacturing process used to achieve this construction. Each bare electrically conductive coil 12 is first bathed in a mild acidic solution to clean the coil and remove any impurities existing on the coil surface. By way of example, the bath can comprise a 3% concentration of phosphoric acid in tap water. Once having been cleaned in this manner, the bare coil 12 is loaded onto a coating frame 36 as indicated in FIG. 4. Typically, the coating frame 36 simply comprises a support rod or beam 38 that extends through and supports the coil 12. The rod or beam 38 is suspended by one or more suspension members 40 that typically are operably connected to a conveyor system (not shown). Although described as specifically comprising a coating frame and a conveyor system, it is to be understood that myriad alternative components and/or machines could be used to support and transport the bare coils, as desired.

Once loaded onto the coating frame 36, the bare coil 12 is transported to a coating station where the entire coil is coated with an electrically insulative material 14 such as a powder coating material 42 which is ejected from a delivery device 44 such as a nozzle. Preferably, the powder coating material 42 comprises a high temperature, electrical grade epoxy such as Epoxy 5388 available from 3M. It will be appreciated that alternative suitable high temperature, electrically insulative materials could similarly be used. The powder coating material 42 is electrostatically charged so as to be attracted to the electrically grounded bare coil 12 such that, once the powder coating material is ejected from the delivery device 44, it naturally gravitates toward and adheres to all surfaces of the coil 12. As will be appreciated by those having ordinary skill in the art, several such coils 12 can be coated simultaneously in the manner described above, if desired. Indeed, it is presently contemplated that the conveyor system will be configured to continually transport bare coils 12 for powder coating in a referred embodiment.

Figure 5:
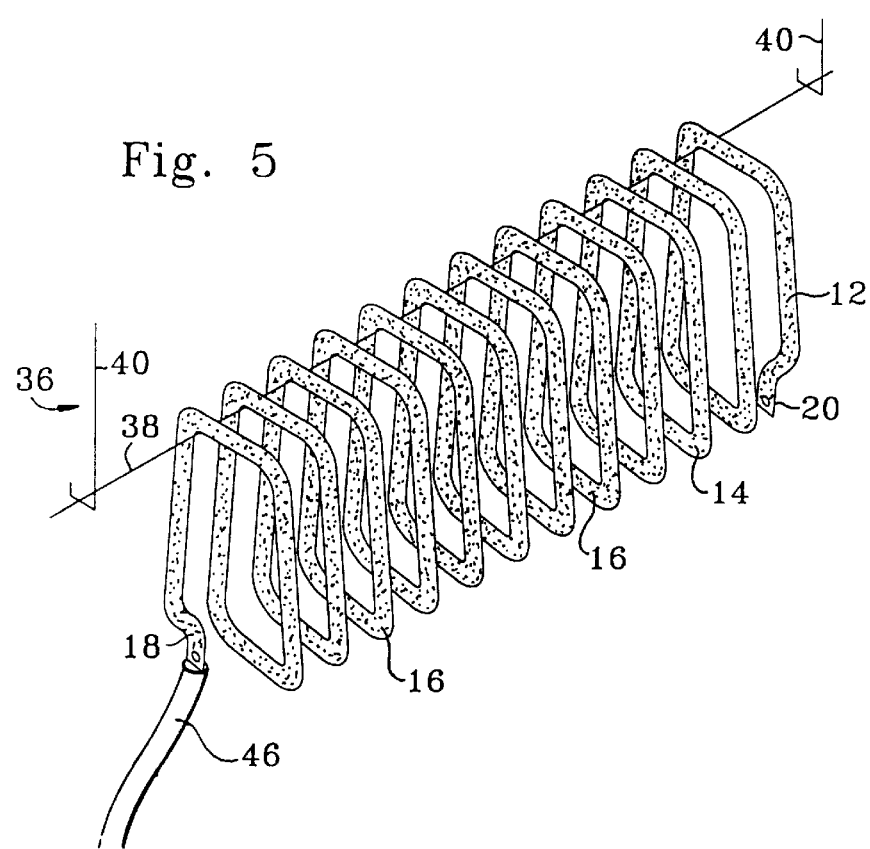
FIG. 5 is a perspective view of a powder coated coil depicting removal of the powder coating material from the coil terminal leads.

To ensure complete coverage of each coil 12, the coil turns 16 normally are separated by, for example, at least one-half inch. In addition, the coating station normally includes a plurality of delivery devices 44 positioned on both sides of the coils 12 such that each side of each coil is fully covered with the powder coating material 42. Once the powder application step has been completed, the powder coating material 42 disposed on the terminal leads 18, 20 is removed. This material can be removed through the use of a vacuum tube 46 as indicated in FIG. 5. The vacuum tube 46 is placed over the portion of the terminal lead 18, 20 from which the powder coating material 42 is desired to be removed. In that the vacuum tube 46 is in fluid communication with a vacuum source (not shown), the excess powder can be suctioned away from the surface of the leads 18, 20, and collected in a remote reservoir. As an alternative to removing this excess powder coating material 42 with a vacuum tube 46, it is to be appreciated that the terminal leads 18, 20 could instead be masked prior to the powder coating step, if desired.

After the excess powder coating material 42 has been removed from the terminal leads 18, 20, the powder coated coils 12 are transported to an oven (not shown) in which the coils 12 are heated from ambient temperature of about 15–38° C. to a range of about 170–180° C. and then allowed to cool to effect partial cure of the powder coating material 42. Although the time and temperature involved to effect this partial cure will vary depending upon the type and amount of powder coating material used, the mass and surface area of the coil, and the oven type and setting, the time can be typically about 5–7 minutes. Once having been partially cured in this manner and having been allowed to cool, each coil 12 is shifted on its powder coating frame 36 such that the contact points between the coil turns 16 and the rod or beam 38 are fully exposed. The coils 12 then are once more coated with the powder coating material 42 in the same manner as described above to ensure complete coverage of all coil surfaces. After having been coated with the second layer of powder material 42, the coils 12 are then moved back to the oven for curing. During this second stage of curing, however, the coils 12 are only heated from ambient temperature of about 15–38° C. to a range of about 120–130° C. and then allowed to cool to effect partial cure. Although the time and temperature involved to effect this partial cure will vary depending upon the type and amount of powder coating material used, the mass and surface area of the coil, and the oven type and setting, the time can be typically about 5–7 minutes. The electrically conductive coil 12 then is removed from the frame 36 and reoriented in a collapsed configuration shown in FIG. 6.

Figure 6:
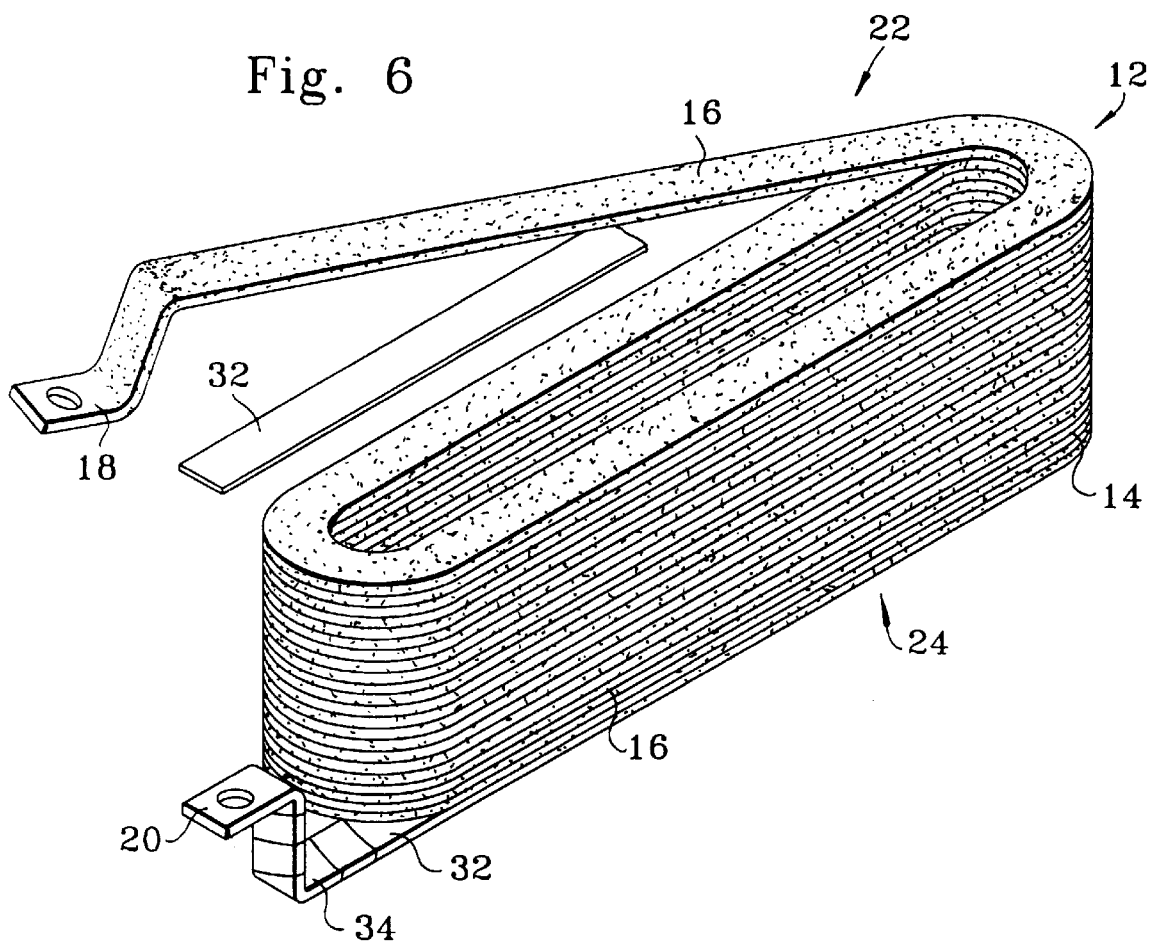
FIG. 6 is a perspective view of the powder coated coil depicting insertion of a strip of protective material between two turns of the coil.

At this point, the electrically conductive coil 12 is nearly prepared for shaping in conformity with its associated pole. Prior to this step, preferably, the coil 12 is fitted with the strips 32 of protective material, such as an aramid material, as shown in FIG. 6. One strip 32 of material normally is provided at each of the frame and pole sides 22 and 24 of the coil 12 in between the first and second turns 16 of each side typically along the full length of the coil 12. These strips 32 of material are secured in place with insulation tape 34 applied adjacent the terminal leads 18, 20. Once so placed, the strips 32 provide protection to the coil 12 against the compressive forces to which the coil is subjected during the pressing step described immediately below.

Figure 3:
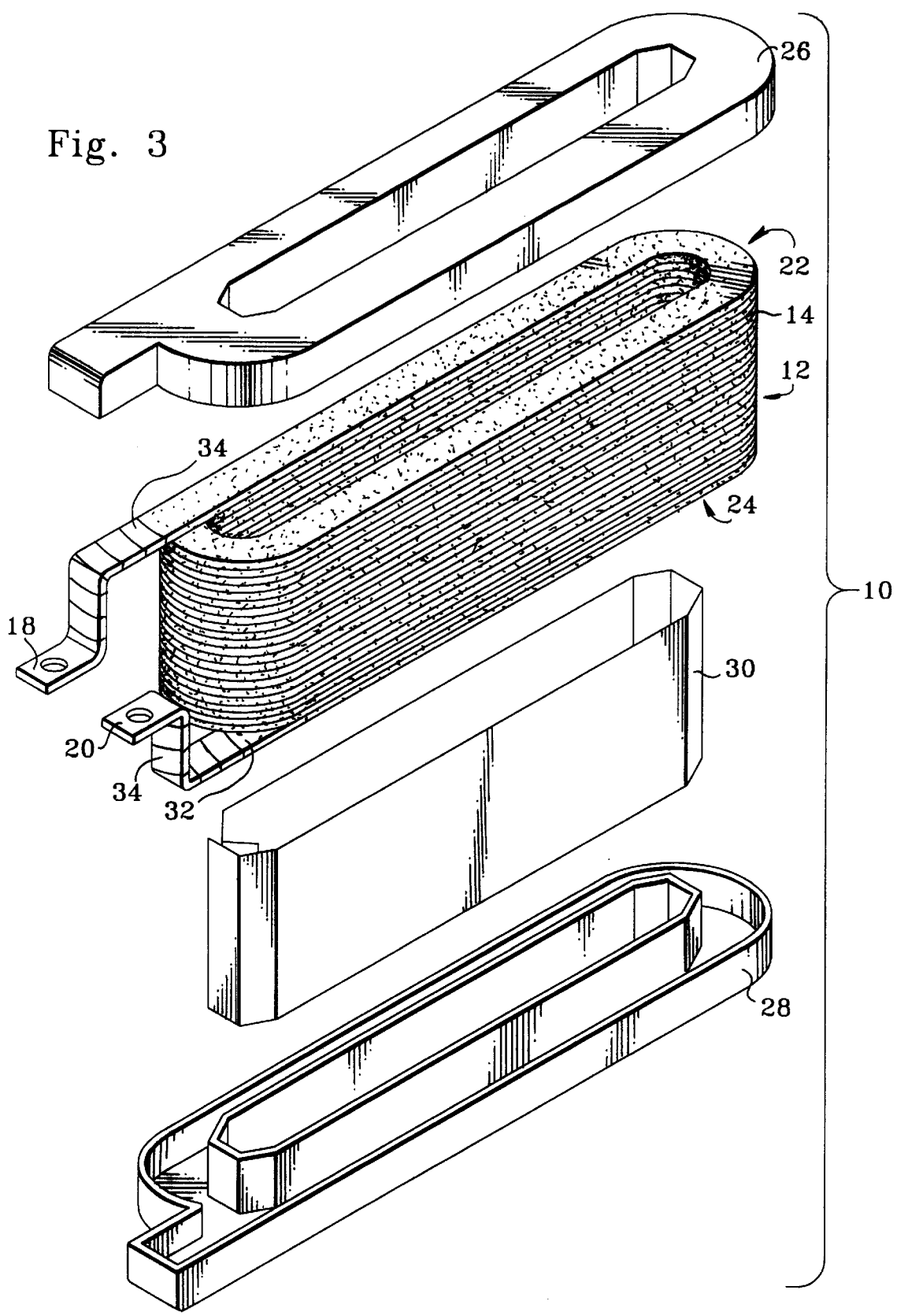
FIG. 3 is an exploded perspective view of the coil of FIG. 1.
Figure 7:
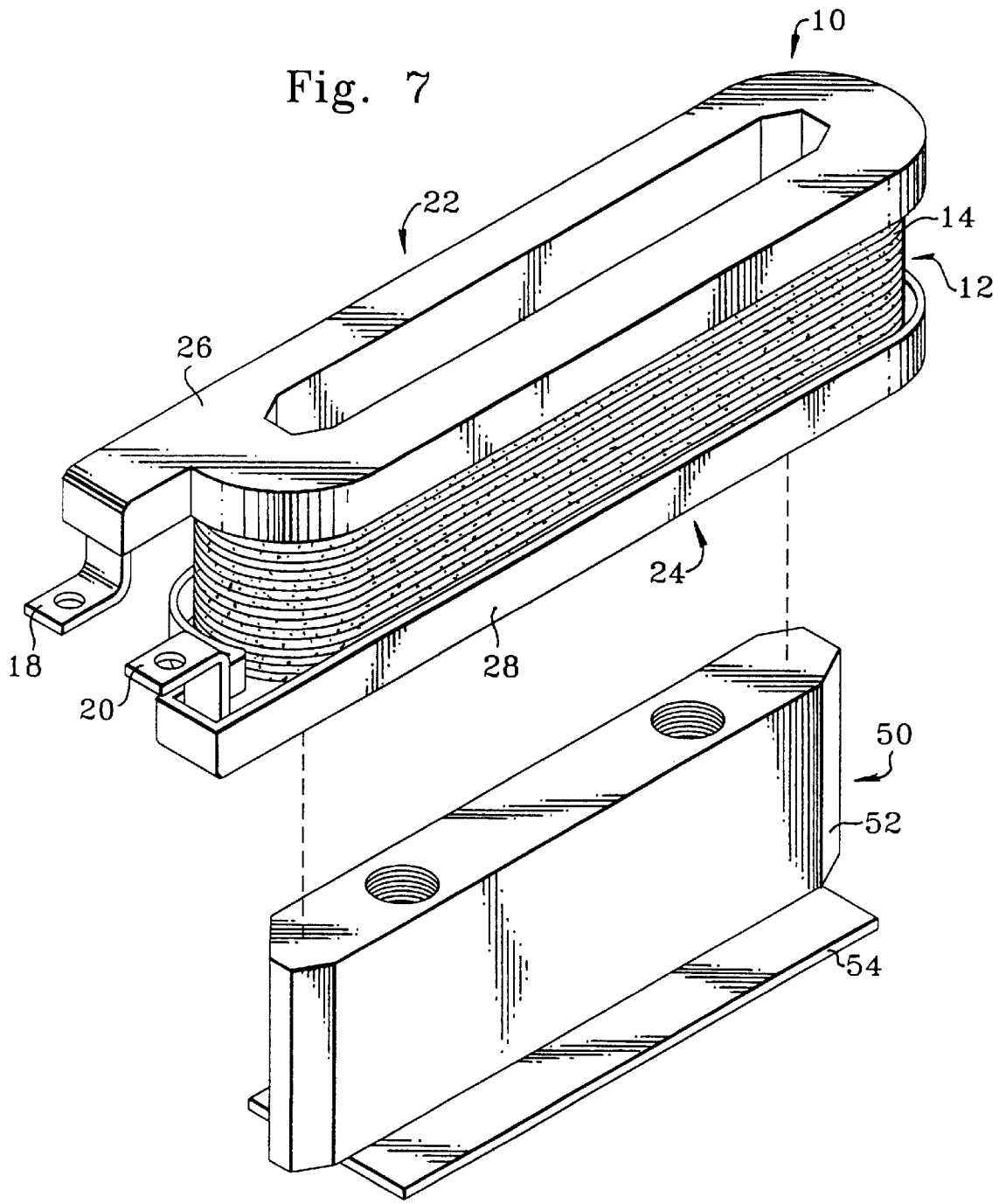
FIG. 7 is an exploded view of a coil and pole assembly.
Figure 8:
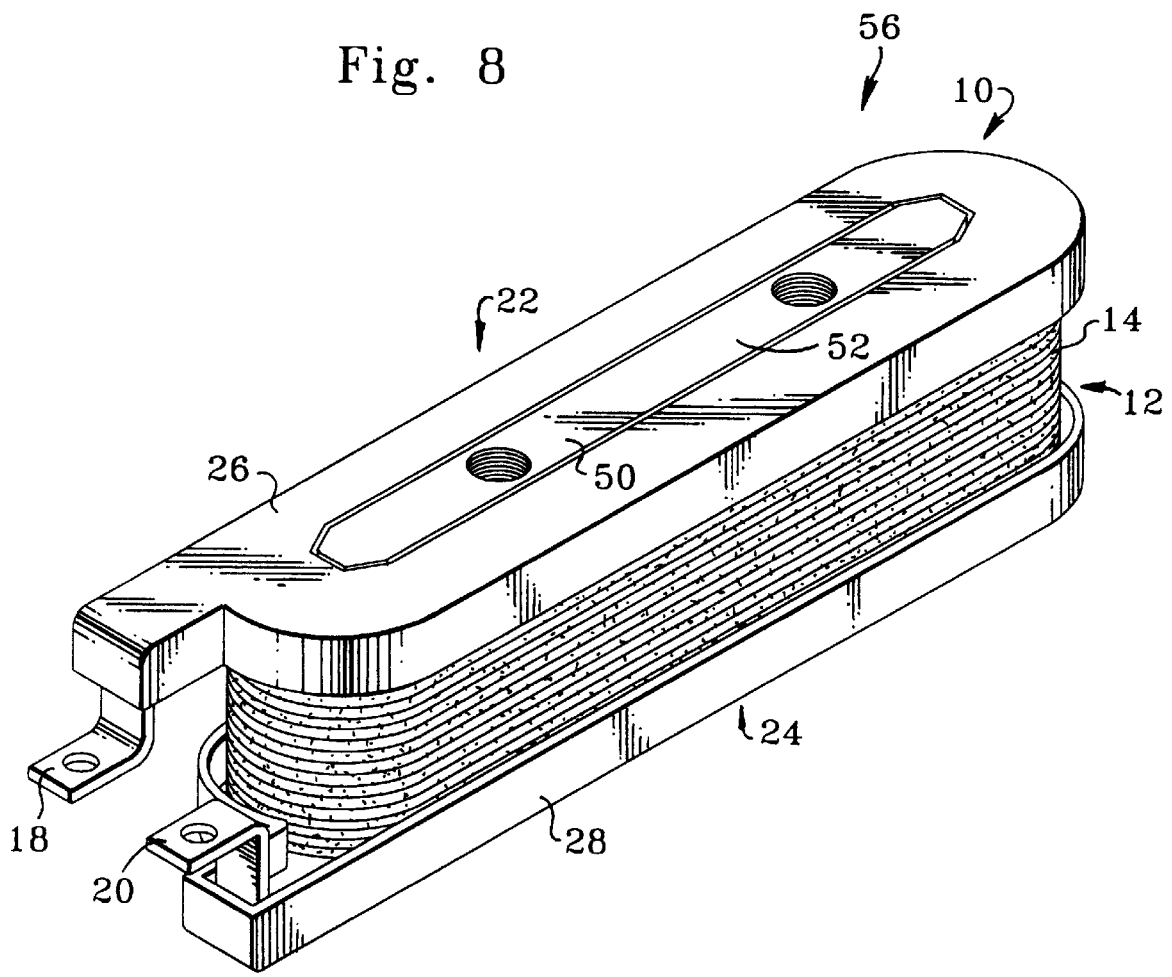
FIG. 8 is a top perspective view of an assembled coil and pole assembly.
Figure 9:
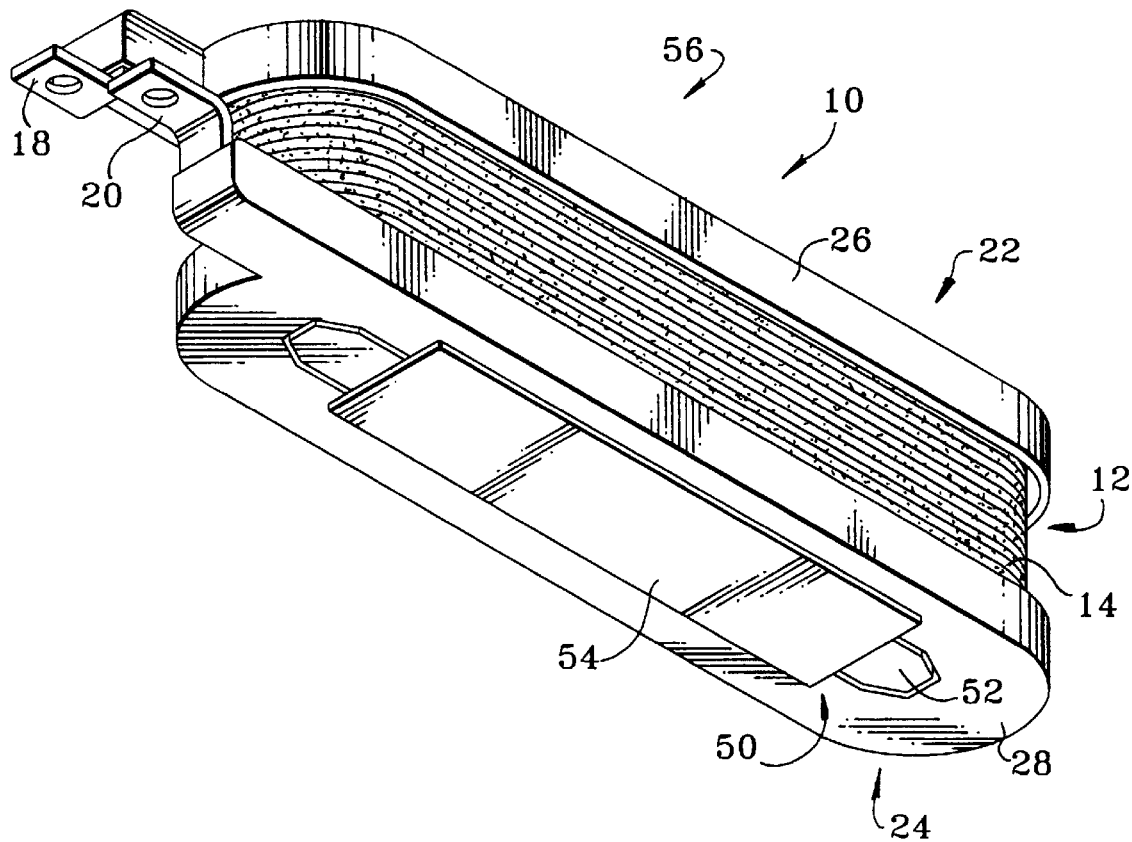
FIG. 9 is a bottom perspective view of the coil and pole assembly of FIG. 8.
Figure 10:
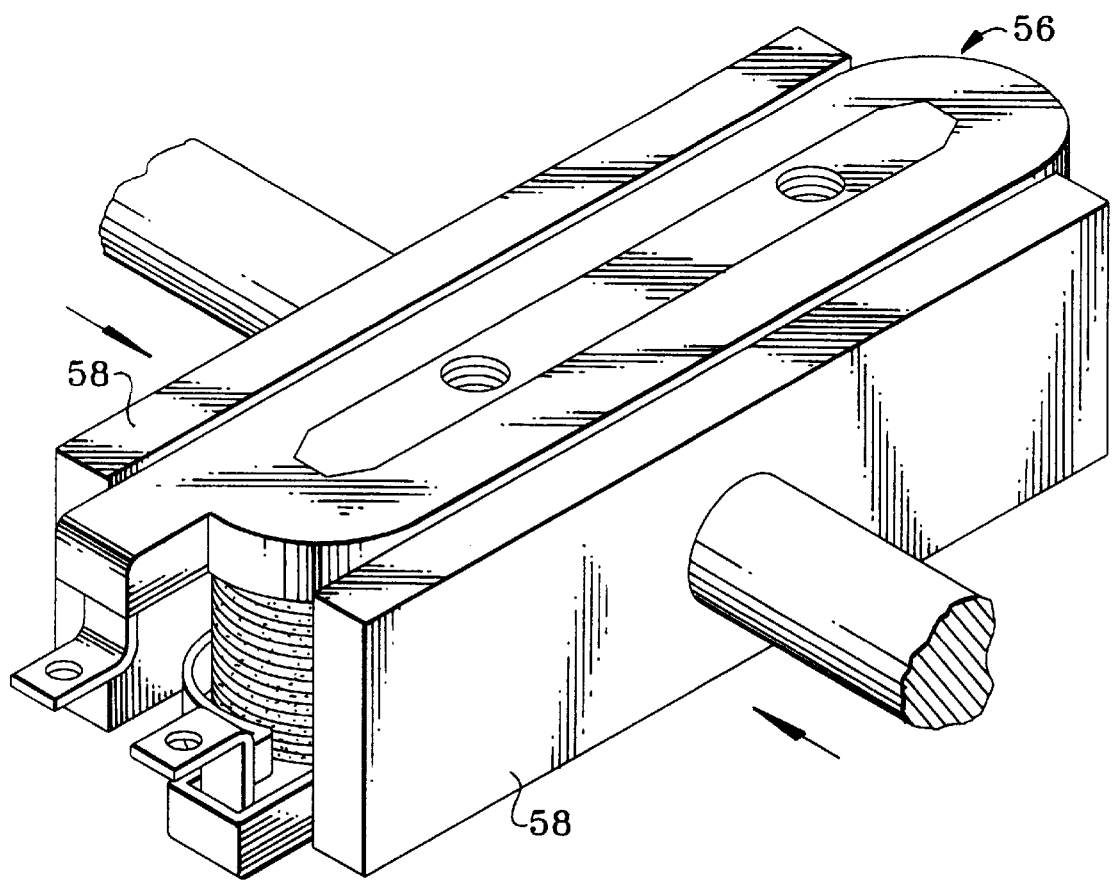
FIG. 10 is a perspective view of the coil and pole assembly of FIG. 8 depicting horizontal pressing of the coil.
Figure 11:
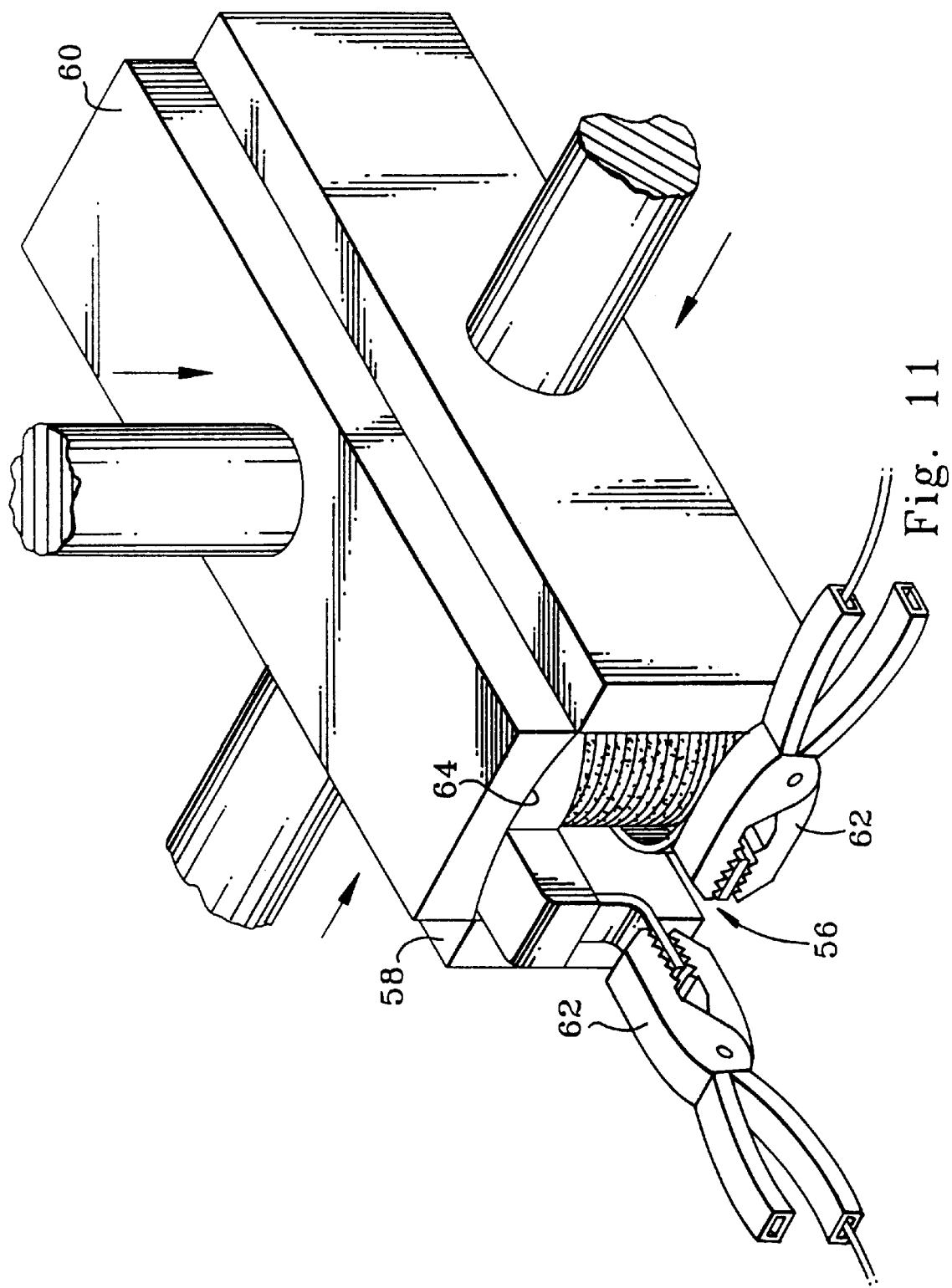
FIG. 11 is a perspective view of the coil and pole assembly of FIG. 8 depicting horizontal and vertical pressing of the coil and final curing of the powder coating material.

The insulated coil 12 next is transported to a pressing station where it is fitted with its bobbins 26, 28, pole insulator 30, and placed about its pole 50 as shown in FIGS. 3 and 7. Pole 50 generally comprises a body portion 52 constructed of a ferrous material such as steel, and a flange portion 54 that is connected to an end of the body portion. As noted above, the pole opening 17 formed in the insulated coil 10 is adapted for receipt of the pole body portion 52. Accordingly, the pole 50 can be disposed within the insulated coil 10 as depicted in FIGS. 8 and 9 to form a coil and pole assembly 56. After the coil 10 and pole 50 have been combined to form the coil and pole assembly 56, the assembly can be pressed, for example, in a hydraulic press. In particular, the coil and pole assembly 56 is pressed in a horizontal direction with horizontal press members 58 as shown in FIG. 10, and pressed in the vertical direction with vertical press member 60 as shown in FIG. 11. Although the amount of force exerted upon the coil and pole assembly 56 may be varied to suit the particular application, typically approximately 20 psi (pounds per square inch) to 30 psi is applied to the assembly 56 in the horizontal direction and approximately 200 psi is applied to the assembly in the vertical direction. As illustrated in FIG. 11, the horizontal and vertical pressing steps can be conducted simultaneously.

To facilitate proper compression of the coil 10 and to completely cure the powder coating material 42 formed thereon, the electrically conductive coil 12 is electrically heated. In particular, the terminal leads 18, 20 are connected to resistance heater leads 62 which heat the coil 12 from ambient temperature of about 15–38° C. to about 120° C. to 140° C. in about 2 minutes dependent on the mass of the coil and applied voltage and current flow. At this temperature, the powder coating material 42 will flow and allow the coil 10 to compress to the proper dimensions. Primarily, it is the second coat of the powder coating material 42 which flows under pressure to permit proper coil height, while it is the combined layers of powder coating material 42 which prevent the turns 16 of the electrically conductive coil 12 from making contact with each other such as to prevent short circuits during use. As indicated in FIG. 11, the vertical press member 60 can comprise an arcuate press surface 64 that ensures that the frame side 22 of bobbin 26 is shaped to conform to the arcuate inner surface of a magnet frame in which the coil and pole assembly 56 will be installed (see FIG. 12). Notably, in that the pressing step is accomplished with the pole 50 disposed within the insulated coil 10, and due to the spacing provided by the bobbins 26, 28, the NOME) shims normally required in the prior art to achieve coil 10 height are unnecessary.

Once the proper coil height has been achieved, the temperature of the coil 12 is raised to about 220° C. to 240° C. in about 2 minutes dependent on the mass of the coil and applied voltage and current flow. This higher temperature completely cures the powder coating material 42 and effects complete crosslinking of the layers of powder coating to create a strong bond between the coil turns. Once the powder coating material 42 has been completely crosslinked or thermoset, it is extremely strong and results in an insulated coil 10 which behaves mechanically as a solid body.

Figure 12:
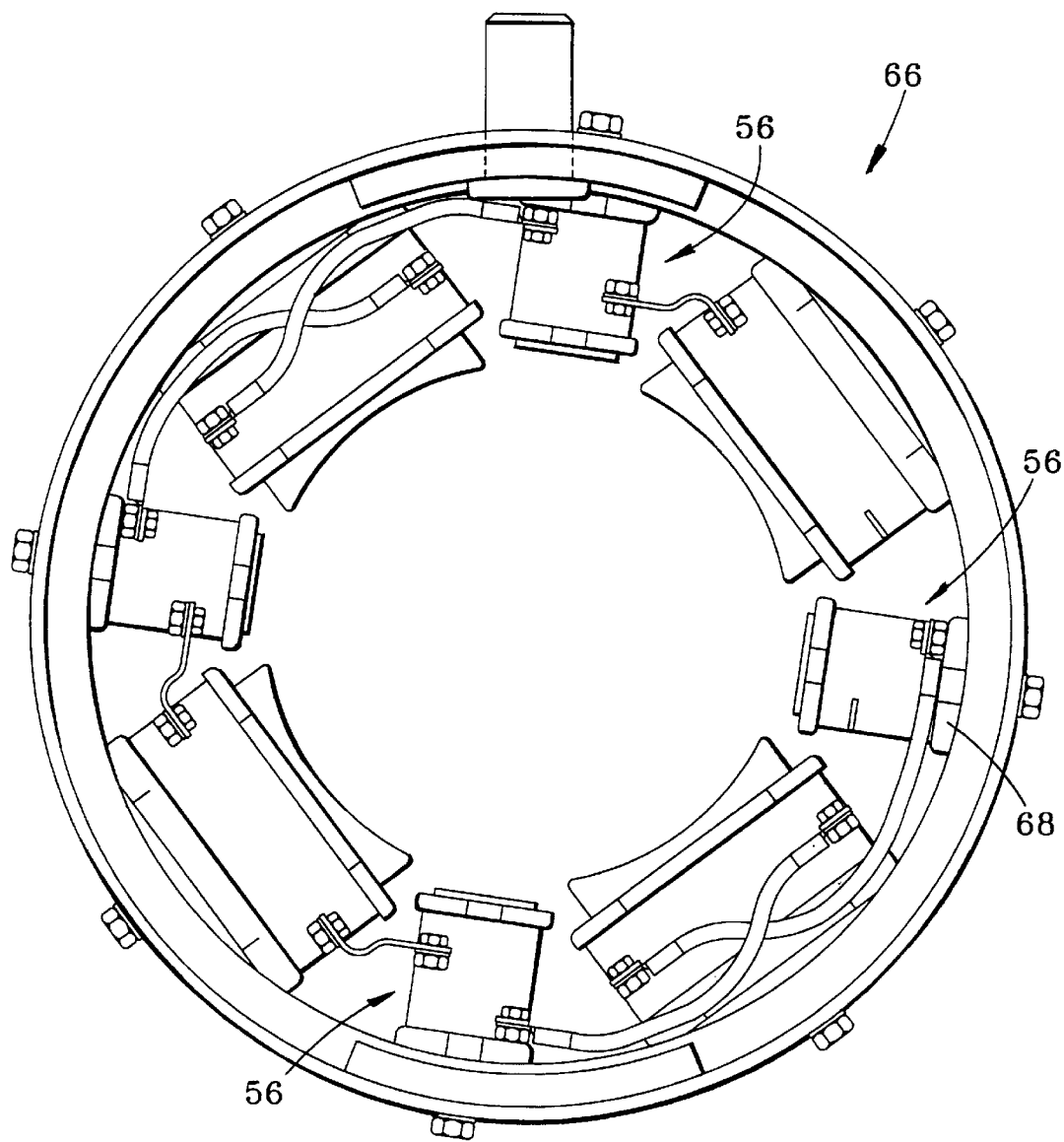
FIG. 12 is an end view of a coiled frame including a plurality of coil and pole assemblies.

After the insulated coil/pole assembly 56 has adequately cooled and has been removed from the press, the coil is prepared for installation within a magnet frame 66 as indicated in FIG. 12. As shown in FIG. 12, several coil and pole assemblies 56 of various shapes and sizes can be installed around the inner radial periphery of the frame 66. Once each coil and pole assembly 56 is installed in the magnet frame 66, the terminal leads 18, 20 of each insulated coil 10 are electrically connected as desired and are insulated with an insulating tape material such as an epoxy tape. The coiled frame 66 is then masked with tape on surfaces not to be powder coated and preheated to approximately 160° C. Next, the coiled frame 66 is powder coated in the manner described above in relation to the bare coils 12 such that the entire coiled frame is covered with an epoxy powder coating material 68 similar to that described above. By way of example, Ferro 152C200 Epoxy is deemed suitable for this purpose. As the coiled frame 66 cools, the powder coating material is cured and the masking tape is removed such that the frame is ready for installation and use.

The manner of construction described above presents several advantages not realized by the prior art. First, the actual processes used to construct the insulated coil greatly reduce manufacturing time and the amount of manual labor required during this manufacturing. This reduction in time and labor greatly reduces the costs of construction for each coil. In addition to these manufacturing advantages, the resultant insulated coil is superior to conventional coils in that the insulated coil behaves more as a solid mass of material as opposed to a softer spring-mass system of the conventional coils. This ensures that the coil will be highly resistant to the mechanical vibrations and other forces to which such coils are normally subjected.

While preferred embodiments of the invention have been disclosed in detail in the foregoing description and drawings, it will be understood by those skilled in the art that variations and modifications thereof can be made without departing from the spirit and scope of the invention as set forth in the following claims.

What is claimed is:

1. An insulated electrical coil comprising:

a length of metal strip with electrical termination leads at the strip ends;

the strip being helically wound on itself, with to form a plurality of turns of the strip being in a side-by-side relation with the turns adjacent thereto to define a central pole opening extending longitudinally along the coil between opposite sides of the coil;

a coating of polymeric insulating material carried on the strip and applied as a powder to the strip while in a loosely wound configuration and heated to cure the coating on the strip material when pressed into a wound coil configuration to form a solid coil body; and a pair of preformed bobbins of electrical insulating material pressed on the coil, one of said bobbins being fitted on each of the opposite sides of the coil and covering the respective sides of the coils, with each of said bobbins having a base portion having an inner surface at respective sides of the coil, an outer peripheral flange that projects from the base portion of the bobbin and extending around the coil, and an inner flange that projects from the base portion and into the central pole opening of the coil along the inner surface thereof, the outer peripheral flanges of the bobbins extending parallel to a longitudinal axis of the coil toward each other, but stopping short of each other, whereby the sides of the coil are ground insulated by the bobbins and a substantial length of the coated strip coil intermediate the bobbins being uncovered by the bobbins.

2. The coil of claim 1, wherein the uncovered length of the coil is at least as great as the combined lengths of the outer flanges of the bobbins on the coil.

3. The coil of claim 2, wherein the uncovered length of the coil is greater than the combined lengths of the outer flanges of the bobbins on the coil.

4. The coil of claim 1, wherein the inner flanges of the bobbins extend generally parallel to the longitudinal axis of the coil toward each other but stopping short of each other thereby leaving a length of the coil at the central pole opening uncovered by the bobbins.

5. The coil of claim 4, further comprising a pole insulator disposed in the pole opening and extending between the inner flanges of the bobbins and covering the uncovered portions of the inner surface of the coil at the pole opening.

6. The coil of claim 1, wherein the metal strip includes electrical insulating material between adjacent turns of the coil.

7. The coil of claim 6, wherein the coil is coated with a powder insulating material constituting the electrical insulating material.

8. The coil of claim 7, wherein the powder comprises a high temperature electrical grade epoxy.

9. The coil of claim 8, wherein the epoxy is a cross-linked polymer.

10. The coil of claim 1, wherein the bobbins comprising a thermosetting polymeric material with glass fiber filler.

11. The coil of claim 1, further comprising at least one strip of preformed insulating material positioned between two adjacent turns of the coil at each side of the coil.

* * * * *